United States Patent
Chatham et al.

(10) Patent No.: US 9,261,379 B1
(45) Date of Patent: Feb. 16, 2016

(54) INTERSECTION COMPLETER

(71) Applicant: Google Inc., Mountain View, CA (US)

(72) Inventors: Andrew Hughes Chatham, San Francisco, CA (US); Christopher Paul Urmson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/640,734

(22) Filed: Mar. 6, 2015

Related U.S. Application Data

(63) Continuation of application No. 13/181,068, filed on Jul. 12, 2011, now Pat. No. 8,996,226.

(51) Int. Cl.
*G08G 1/0962* (2006.01)
*G01C 21/36* (2006.01)

(52) U.S. Cl.
CPC .................................. *G01C 21/3658* (2013.01)

(58) Field of Classification Search
USPC .......................................................... 701/25
See application file for complete search history.

(56) References Cited

U.S. PATENT DOCUMENTS

| | | | | |
|---|---|---|---|---|
| 4,679,147 A * | 7/1987 | Tsujii | ................ | G01C 21/3667 340/988 |
| 5,638,280 A * | 6/1997 | Nishimura | ......... | G01C 21/3446 340/990 |
| 5,778,333 A * | 7/1998 | Koizumi | ............ | G01C 21/3694 340/910 |
| 5,940,010 A * | 8/1999 | Sasaki | .............. | G08G 1/096725 340/436 |
| 6,112,143 A * | 8/2000 | Allen | .................... | E01C 19/006 342/357.32 |
| 7,103,366 B2 * | 9/2006 | Bates | .................... | H04M 1/006 342/357.59 |
| 7,447,588 B1 * | 11/2008 | Xu | ....................... | G08G 1/0104 340/988 |
| 2003/0220734 A1 * | 11/2003 | Harrison | ........... | G06F 17/30241 701/409 |
| 2006/0142933 A1 * | 6/2006 | Feng | .................... | G07B 15/063 701/117 |
| 2008/0154489 A1 * | 6/2008 | Kaneda | ............... | G01C 21/3415 701/533 |
| 2008/0162027 A1 | 7/2008 | Murphy et al. | | |
| 2009/0005971 A1 * | 1/2009 | Otsuki | ................... | G01C 21/32 701/532 |
| 2009/0005984 A1 * | 1/2009 | Bradley | ................. | G01C 21/20 701/469 |
| 2009/0088916 A1 | 4/2009 | Elgersma et al. | | |
| 2009/0192703 A1 * | 7/2009 | Hess | ................... | G01C 21/3461 701/532 |
| 2010/0100268 A1 | 4/2010 | Zhang et al. | | |
| 2010/0207786 A1 * | 8/2010 | Chen | ...................... | G08G 1/161 340/903 |
| 2010/0256900 A1 * | 10/2010 | Yamaguchi | ............ | G01C 21/36 701/533 |

OTHER PUBLICATIONS

Douglas A. Reece and Steven Shafer, A Computational Model of Driving for Autonomous Vehicles, Apr. 1991, 47 pages.

* cited by examiner

*Primary Examiner* — Shelley Chen
(74) *Attorney, Agent, or Firm* — Lerner, David, Littenberg, Krumholz & Mentlik, LLP

(57) ABSTRACT

Aspects of the disclosure relate generally to generating roadgraphs for use by autonomous vehicles. A computer may receive input defining aspects of a roadway including an intersection with another roadway, one or more traffic control features, and one or more locations at which a vehicle is required to observe at least one traffic signal before entering the intersection. A user may identify the intersection, for example, by tracing a perimeter around the intersection. In response, for each particular location of the one or more locations, the computer may identifying a route through the intersection from the particular location and determine, based on the boundary of the intersection and the particular location, a set of the one or more traffic control features must be observed by the vehicle before entering the intersection. This information may then be used to generate a roadgraph.

20 Claims, 12 Drawing Sheets

US 9,261,379 B1

INTERSECTION COMPLETER

CROSS-REFERENCE TO RELATED APPLICATIONS

The present application is a continuation of U.S. patent application Ser. No. 13/181,068, filed Jul. 12, 2011, the disclosure of which is incorporated herein by reference.

BACKGROUND

Autonomous vehicles use various computing systems to aid in the transport of passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

Such vehicles must have access to highly detailed maps in order to maneuver between two locations. The maps may include information such as the direction and location of roadways, lane data, traffic signals, etc. The maps may also include connections identifying the relationships between these features. In one example, a map may include a location at which a vehicle must begin to make a turn at an intersection. The location may be associated with one or more connections to traffic signals which the vehicle must observe before safely making the turn at the intersection.

These maps may be generated manually by comparing multiple sources of information such as road maps, photographs, laser intensity data, etc., and mapping the various features and the connections between them. For example, connecting the traffic signals at a typical four-way intersection (two streets crossing one another) to the locations at which the vehicle must observe the traffic signals may take a human mapper a half hour or more to complete. Thus, generation of these maps may require significant human resources.

BRIEF SUMMARY

One aspect of the disclosure provides a method of generating a roadgraph graphically representing aspects of an intersection. The method includes receiving, by a processor, input from a user defining aspects of a first roadway including an intersection with a second roadway, one or more traffic control features, and one or more locations at which a vehicle is required to observe at least one of the one or more traffic control features before entering the intersection; displaying the aspects of the first and second roadways including the intersection; receiving input from a user defining a perimeter around the intersection; calculating a boundary of the intersection based on the perimeter and the aspects of the first and second roadways. For each particular location of the one or more locations, the method also includes identifying a route through the intersection from the particular location; and determining, based on the boundary of the intersection and the particular location, a set of the one or more traffic control features to be observed by the vehicle before entering the intersection. The method further includes generating a roadgraph based on the user input, the boundary of the intersection, and the determined sets.

In one example, the method also includes transferring the roadgraph to a vehicle in order to navigate the vehicle along the roadway. In another example, the identified route includes making a turn from the first roadway to the second roadway. In another example, the identified route includes crossing through the intersection from one section of the first roadway to another section of the first roadway. In another example, the one or more traffic control features includes a traffic signal light. In another example, the one or more traffic control features includes a stop sign. In another example, the method also includes displaying the roadgraph to the user; and receiving input from the user to adjust at least one set of the determined sets. In this example, generating the roadgraph is further based on the adjusted at least one set.

Another aspect of the disclosure provides a device for generating a roadgraph graphically representing aspects of an intersection. The device includes a display for displaying information to a user and a processor coupled to the display. The processor is operable to receive input from the user defining aspects of a first roadway including an intersection with a second roadway, one or more traffic control features, and one or more locations at which a vehicle is required to observe at least one of the one or more traffic control features before entering the intersection; display the aspects of the first and second roadways including the intersection on the display; receive input from a user defining a perimeter around the intersection; calculate a boundary of the intersection based on the perimeter and the aspects of the first and second roadways. The processor is also operable to, for each particular location of the one or more locations, identify a route through the intersection from the particular location and determine, based on the boundary of the intersection and the particular location, a set of the one or more traffic control features to be observed by the vehicle before entering the intersection. The processor is further operable to generate a roadgraph based on the user input, the boundary of the intersection, and the determined sets.

In one example, the processor is also operable to transfer the roadgraph to a vehicle in order to navigate the vehicle along the roadway. In another example, the identified route includes making a turn from the first roadway to the second roadway. In another example, the identified route includes crossing through the intersection from one section of the first roadway to another section of the first roadway. In another example, the one or more traffic control features includes a traffic signal light. In another example, the one or more traffic control features includes a stop sign. In another example, the processor is also operable to display the roadgraph to the user and receive input from the user to adjust at least one set of the determined sets. In this example, the processor generates the roadgraph based on the adjusted at least one set.

A further aspect of the disclosure provides a tangible, non-transitory, computer-readable storage medium on which computer readable instructions of a program are stored, the instructions, when executed by a processor, cause the processor to perform a method of generating a roadgraph graphically representing aspects of an intersection. The method includes receiving, by a processor, input from a user defining aspects of a first roadway including an intersection with a second roadway, one or more traffic control features, and one or more locations at which a vehicle is required to observe at least one of the one or more traffic control features before entering the intersection; displaying the aspects of the first and second roadways including the intersection; receiving input from a user defining a perimeter around the intersection; and calculating a boundary of the intersection based on the perimeter and the aspects of the first and second roadways.

For each particular location of the one or more locations, the method also includes identifying a route through the intersection from the particular location and determining, based on the boundary of the intersection and the particular location, a set of the one or more traffic control features to be observed by the vehicle before entering the intersection. The method also includes generating a roadgraph based on the user input, the boundary of the intersection, and the determined sets.

In one example, the method also includes transferring the roadgraph to a vehicle in order to navigate the vehicle along the roadway. In another example, the identified route includes making a turn from the first roadway to the second roadway. In another example, the identified route includes crossing through the intersection from one section of the first roadway to another section of the first roadway. In another example, the one or more traffic control features includes a traffic signal light. In another example, the one or more traffic control features includes a stop sign. In another example, the method also includes displaying the roadgraph to the user and receiving input from the user to adjust at least one set of the determined sets. In this example, generating the roadgraph is further based on the adjusted at least one set.

Still a further aspect of the disclosure provides a vehicle. The vehicle includes a braking system configured to decelerate the vehicle, an acceleration system configured to accelerate the vehicle, a steering system configured to change the direction of motion of the vehicle, a processor coupled to the breaking, acceleration, and steering systems, and memory coupled to the processor. The memory stores a roadgraph generated by receiving input from a user defining aspects of a first roadway including an intersection with a second roadway, one or more traffic control features, and one or more locations at which a second vehicle is required to observe at least one of the one or more traffic control features before entering the intersection; displaying the aspects of the first and second roadways including the intersection; receiving input from a user defining a perimeter around the intersection; calculating a boundary of the intersection based on the perimeter and the aspects of the first and second roadways; for each particular location of the one or more locations: identifying a route through the intersection from the particular location; and determining, based on the boundary of the intersection and the particular location, a set of the one or more traffic control features to be observed by the vehicle before entering the intersection; and generating the roadgraph based on the user input, the boundary of the intersection, and the determined sets. The processor is operable to access the roadgraph from the memory and use the roadgraph to navigate the vehicle along a route by controlling one or more of the braking, acceleration, and steering systems.

DETAILED DESCRIPTION

Figure 1:
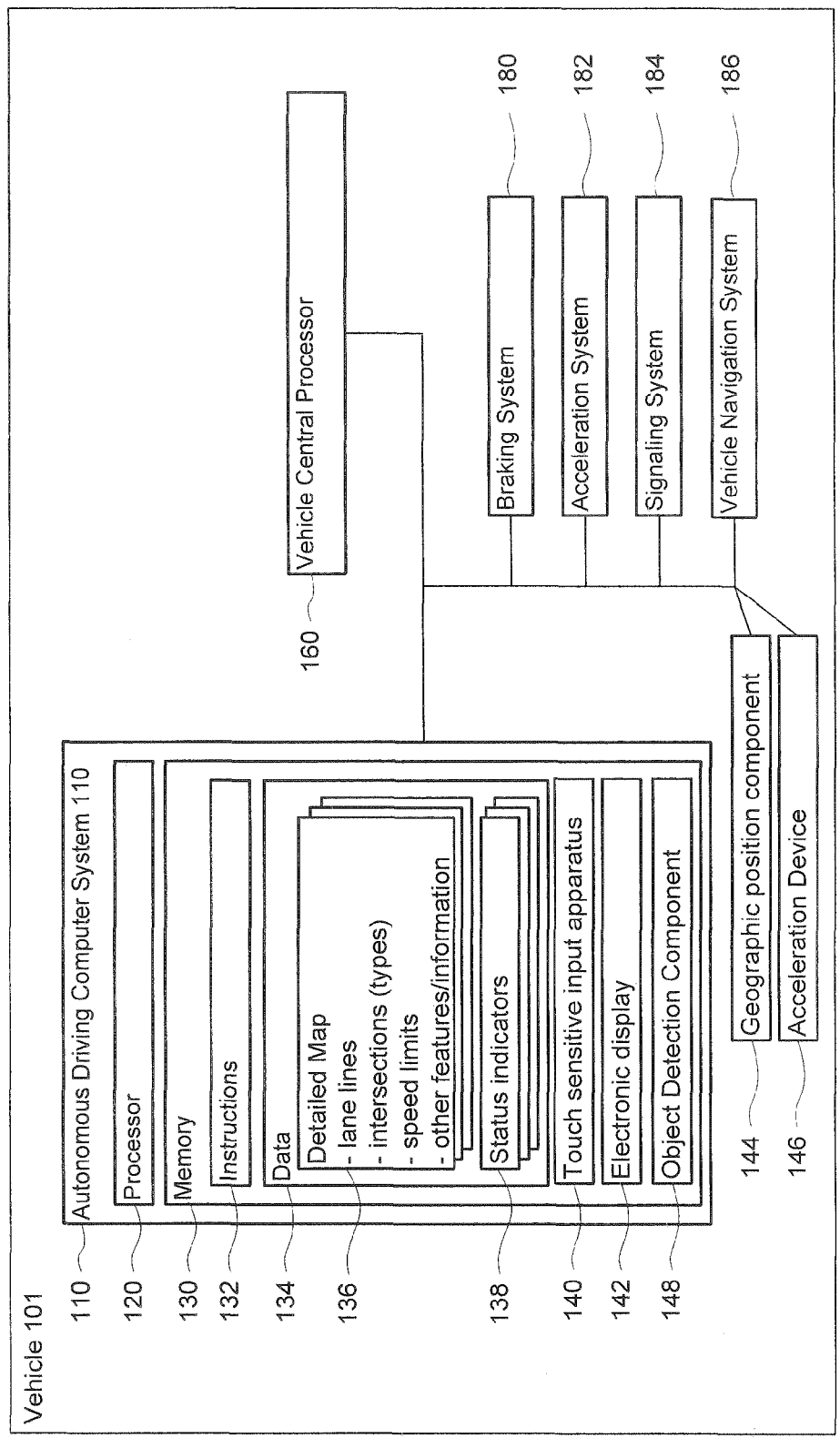
FIG. 1 is a functional diagram of a system in accordance with an exemplary embodiment.

As shown in FIG. 1, an autonomous driving system 100 in accordance with one aspect of the disclosure includes a vehicle 101 with various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated device such as an ASIC. Although FIG. 1 functionally illustrates the processor, memory, and other elements of computer 110 as being within the same block, it will be understood by those of ordinary skill in the art that the processor and memory may actually comprise multiple processors and memories that may or may not be stored within the same physical housing. For example, memory may be a hard drive or other storage media located in a housing different from that of computer 110. Accordingly, references to a processor or computer will be understood to include references to a collection of processors or computers or memories that may or may not operate in parallel. Rather than using a single processor to perform the steps described herein some of the components such as steering components and deceleration components may each have their own processor that only performs calculations related to the component's specific function.

In various of the aspects described herein, the processor may be located remote from the vehicle and communicate with the vehicle wirelessly. In other aspects, some of the processes described herein are executed on a processor disposed within the vehicle and others by a remote processor, including taking the steps necessary to execute a single maneuver.

Computer 110 may all of the components normally used in connection with a computer such as a central processing unit (CPU), memory (e.g., RAM and internal hard drives) storing data 134 and instructions such as a web browser, an electronic display 142 (e.g., a monitor having a screen, a small LCD touch-screen or any other electrical device that is operable to display information), user input 140 (e.g., a mouse, keyboard, touch screen and/or microphone), as well as various sensors (e.g., a video camera) for gathering the explicit (e.g., a gesture) or implicit (e.g., "the person is asleep") information about the states and desires of a person.

Figure 2:
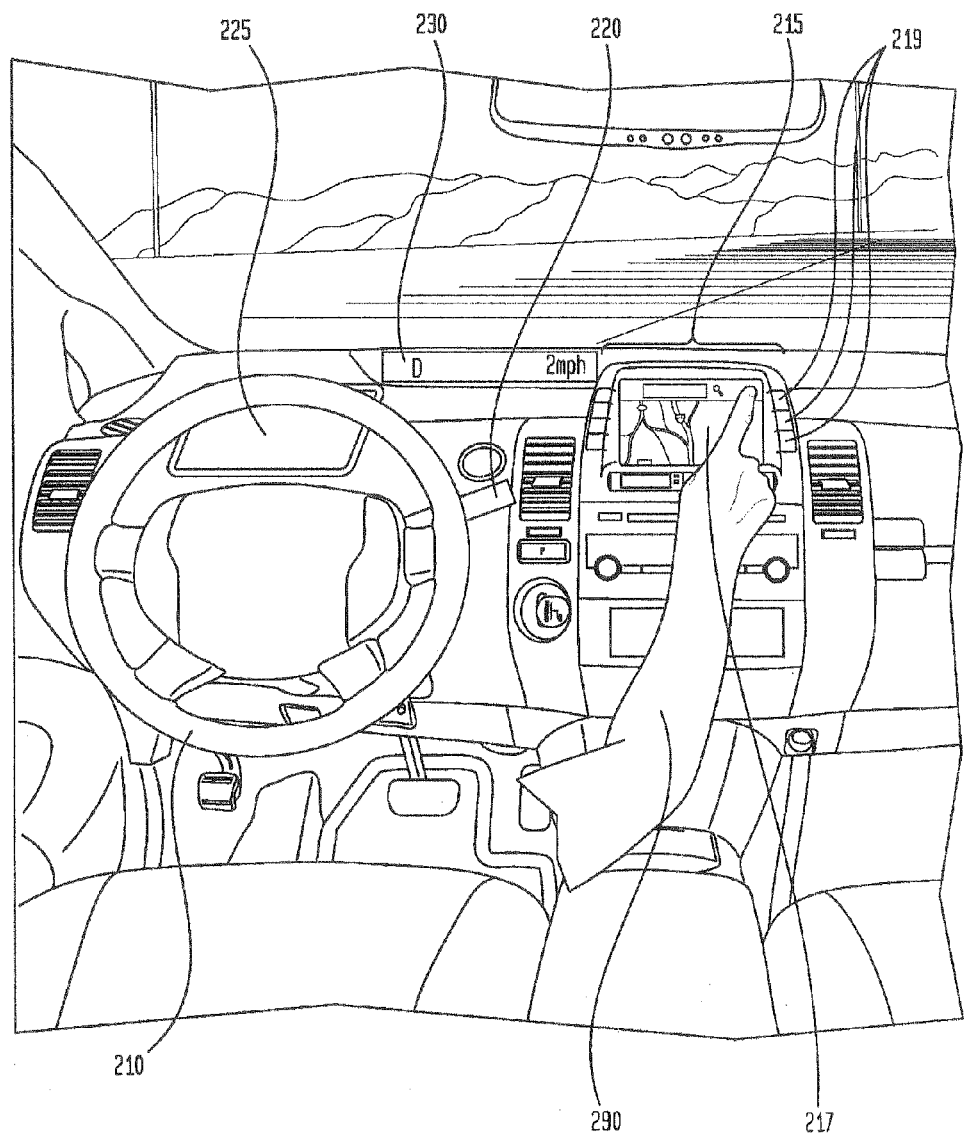
FIG. 2 is an interior of an autonomous vehicle in accordance with an exemplary embodiment.

In one example, computer 110 may be an autonomous driving computing system incorporated into vehicle 101. FIG. 2 depicts an exemplary design of the interior of an autonomous vehicle. The autonomous vehicle may include all of the features of a non-autonomous vehicle, for example: a steering apparatus such as steering wheel 210, a navigation display apparatus such as navigation display 215, and a gear selector apparatus such as gear shifter 220. The vehicle may also have various user input devices, such as gear shifter 220, touch screen 217, or button inputs 219, for activating or deactivating one or more autonomous driving modes and for enabling a driver or passenger 290 to provide information, such as a navigation destination, to the autonomous driving computer 110.

Vehicle 101 may also include one or more status indicating apparatuses, such as display 225 or status bar 230, to indicate the current status of vehicle 101. In the example of FIG. 2, status bar 230 displays "D" and "2 mph" indicating that the vehicle is presently in drive mode and is moving at 2 miles per hour. In that regard, the vehicle may display text on an electronic display, illuminate portions of vehicle 101, such as steering wheel 210, or provide various other types of indications.

The autonomous driving computing system may capable of communicating with various components of the vehicle. For example, returning to FIG. 1, computer 110 may be in communication with the vehicle's conventional central processor 160 and may send and receive information from the various systems of vehicle 101, for example the braking 180, acceleration 182, signaling 184, and navigation 186 systems in order to control the movement, speed, etc. of vehicle 101. In addition, when engaged, computer 110 may control some or all of these functions of vehicle 101 and thus be fully or merely partially autonomous. It will be understood that although various systems and computer 110 are shown within vehicle 101, these elements may be external to vehicle 101 or physically separated by large distances.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The vehicle may also include other features in communication with computer 110, such as an accelerometer, gyroscope or another direction/speed detection device 146 to determine the direction and speed of the vehicle or changes thereto. By way of example only, device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer may control the direction and speed of the vehicle by controlling various components. By way of example, if the vehicle is operating in a completely autonomous mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

Figure 3:
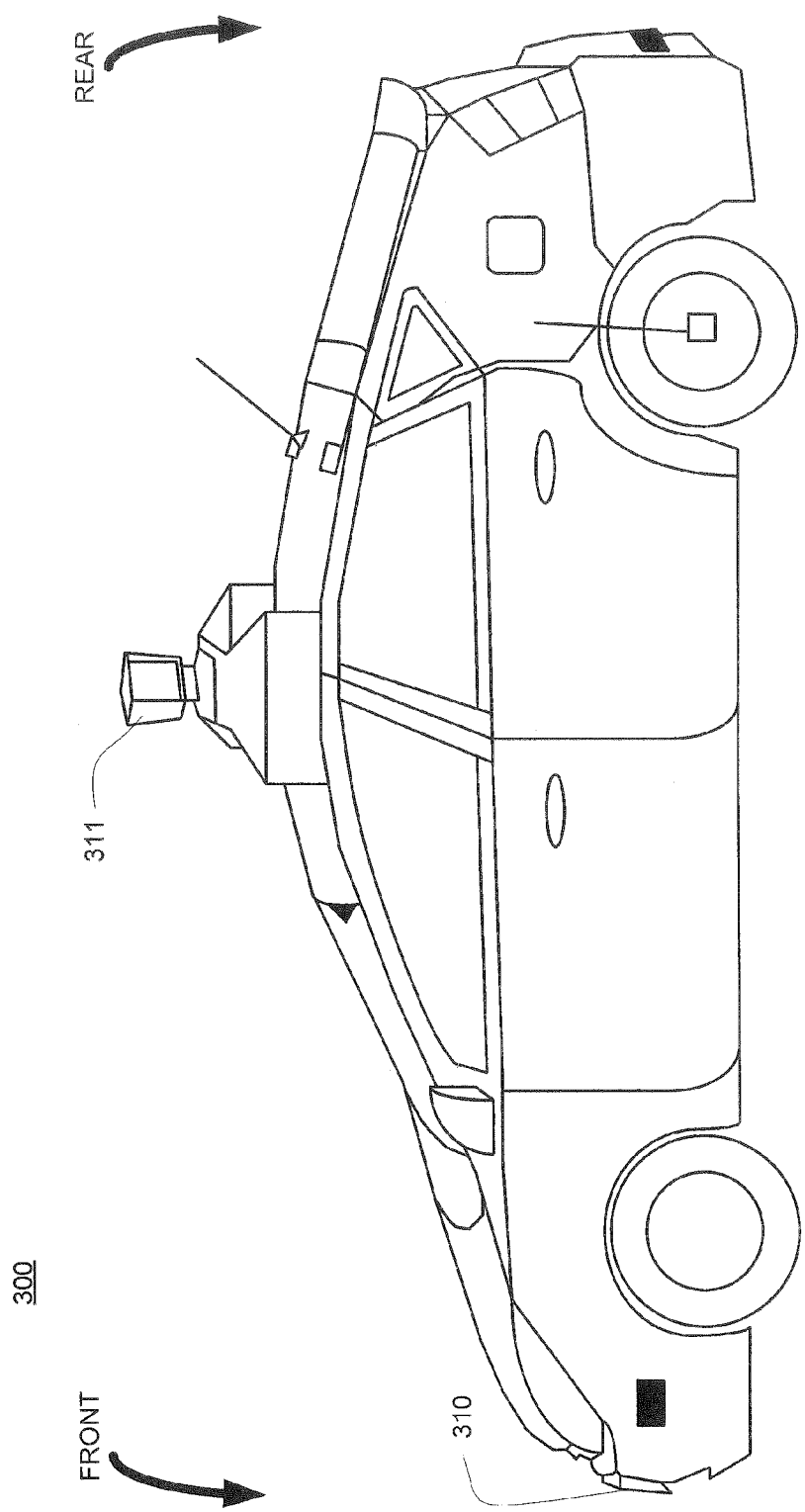
FIG. 3 is an exterior of an autonomous vehicle in accordance with an exemplary embodiment

The vehicle may also include components for detecting objects external to the vehicle such as other vehicles, obstacles in the roadway, traffic signals, signs, trees, etc. The detection system may include lasers, sonar, radar, cameras or any other detection devices which record data which may be processed by computer 110. For example, if the vehicle is a small passenger vehicle, the car may include a laser mounted on the roof or other convenient location. As shown in FIG. 3, small passenger vehicle 300 may include lasers 310 and 311, mounted on the front and top of the vehicle, respectively. The lasers may include commercially available lasers such as the Velodyne HDL-64 or other models. In one example, laser 310 may have a range of 150 meters, a thirty degree vertical field of view, and a thirty degree horizontal field of view. Laser 311 may have a range of 50-80 meters, a thirty degree vertical field of view, and a 360 degree horizontal field of view. The laser may provide the vehicle with range and intensity information which the computer may use to identify the location and distance of various objects in the vehicles surroundings. In one aspect, the laser may measure the distance between the vehicle and the object surfaces facing the vehicle by spinning on its axis and changing its pitch.

The aforementioned sensors may allow the vehicle to understand and potentially respond to its environment in order to maximize safety for passengers as well as objects or people in the environment. It will be understood that the vehicle types, number and type of sensors, the sensor locations, the sensor fields of view, and the sensors' sensor fields are merely exemplary. Various other configurations may also be utilized.

In addition to the sensors described above, the computer may also use input from sensors typical non-autonomous vehicles. For example, these sensors may include tire pressure sensors, engine temperature sensors, brake heat sensors, brake pad status sensors, tire tread sensors, fuel sensors, oil level and quality sensors, air quality sensors (for detecting temperature, humidity, or particulates in the air), etc.

Many of these sensors provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

In addition to processing data provided by the various sensors, the computer may rely on environmental data that was obtained at a previous point in time and is expected to persist regardless of the vehicle's presence in the environment. For example, returning to FIG. 1, data 134 may include detailed map information 136, e.g., highly detailed maps identifying the shape and elevation of roadways, lane lines, intersections, crosswalks, speed limits, traffic signals, buildings, signs, real time traffic information, or other such objects and information. For example, the map information may include explicit speed limit information associated with various roadway segments. The speed limit data may be entered manually or scanned from previously taken images of a speed limit sign using, for example, optical-character recognition. The map information may include three-dimensional terrain maps incorporating one or more of objects listed above. For example, the vehicle may determine that another car is expected to turn based on real-time data (e.g., using its sensors to determine the current GPS position of another car) and other data (e.g., comparing the GPS position with previously-stored lane-specific map data to determine whether the other car is within a turn lane).

Again, although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Figure 4A:
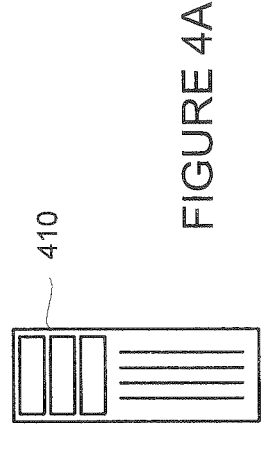
FIG. 4A is a pictorial diagram of a system in accordance with an exemplary embodiment.
Figure 4A:
Figure 4A:
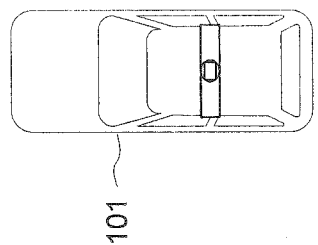
Figure 4B:
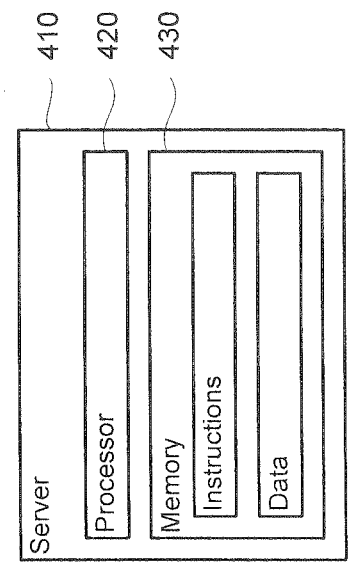
FIG. 4B is a functional diagram of a system in accordance with an exemplary embodiment.
Figure 4B:
Figure 4B:
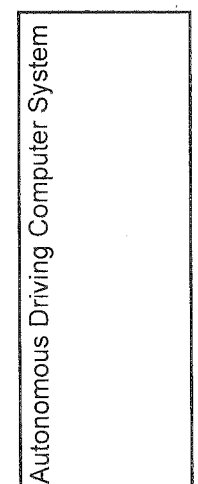

The roadgraphs stored by computer 110 may be received or transferred from other computers which process the roadgraphs as described herein. For example, as shown in FIGS. 4A and 4B, data from computer 410 may be transmitted via a network to computer 110 for further processing. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems and wireless interfaces. In another example, data may be transferred by storing it on memory which may be accessed by or connected to computers 110 and 410.

In one example, computer 410 may comprise a server having a plurality of computers, e.g., a load balanced server farm, that exchange information with different nodes of a network for the purpose of receiving, processing and transmitting the data from computer 110. The server may be configured similarly to the computer 110, with a processor 420, memory 430, instructions, display, and data.

In addition to the operations described above and illustrated in the figures, various operations will now be described. It should be understood that the following operations do not have to be performed in the precise order described below. Rather, various steps can be handled in a different order or simultaneously, and steps may also be added or omitted.

Information regarding a particular stretch of roadway may be reviewed. For example, the reviewed information may include sensor data, such as data collected by one or more lasers; pictures such as street level images, satellite images, aerial views, etc.; and maps such as elevation maps, roadmaps, etc. The reviewed information may also include data from various map databases, including but not limited to graphical maps, as well as information broadcast from vehicles to infrastructure units. This data may be reviewed manually by a reviewer as in the examples below. However, some or all of this reviewing may be performed by a computer.

Figure 5:
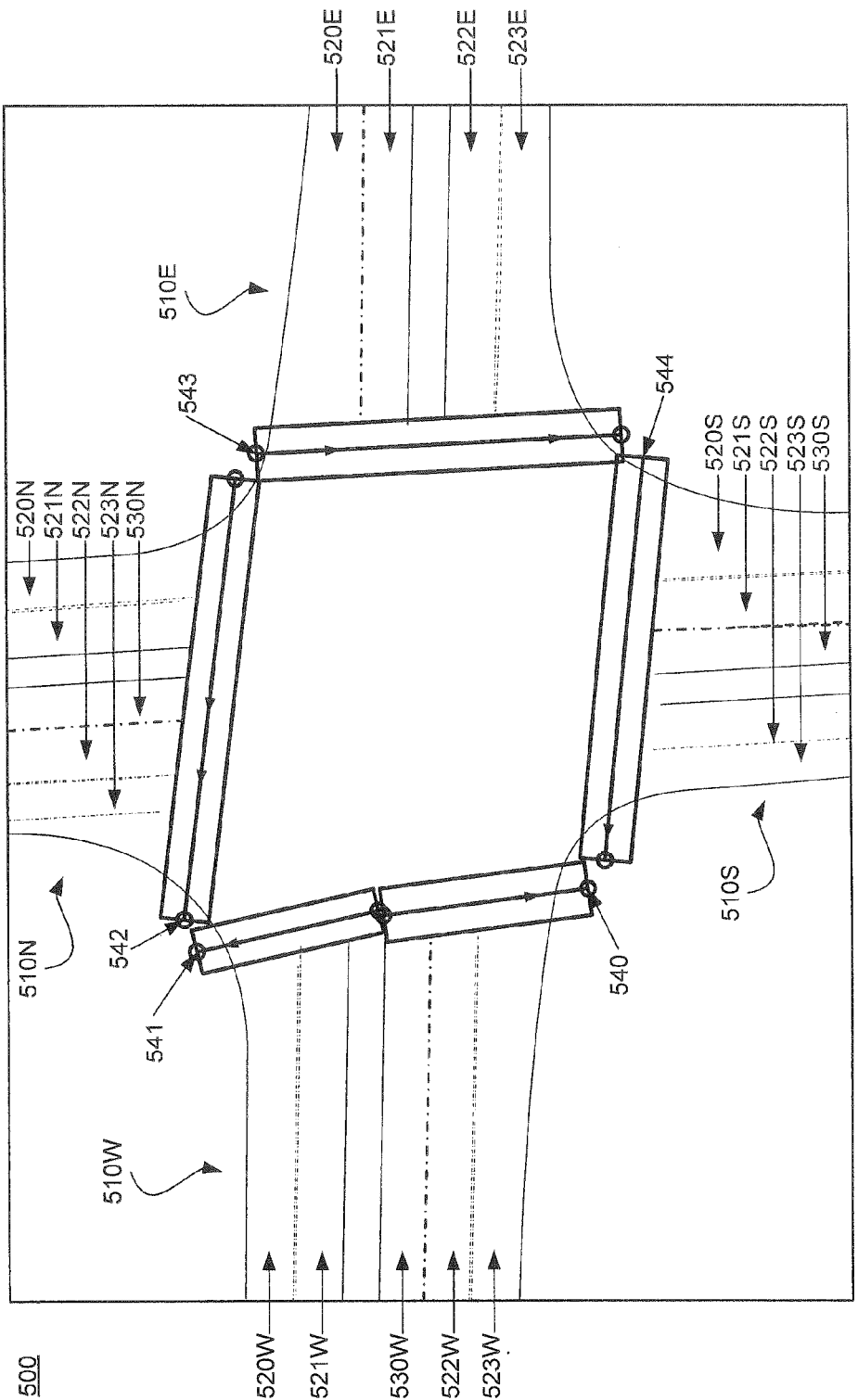
FIG. 5 is a screen shot in accordance with an exemplary embodiment.

The reviewer may analyze the information to identify various aspects of the stretch of roadway. The user may input information into the computer defining aspects of a roadway. In one example, the user may input information which defines a portion of the roadway including an intersection as shown in screen shot 500 of FIG. 5. In this example, two roadways, made up of roadway sections 510N, 510S, 510E, 510W meet at an intersection. Roadway sections 510N, 510S, 510E, 510W each include two lanes in two directions 520N-523N, 520S-523S, 520E-523E, and 520W-523W, respectively. Roadway sections 510W, 510N, and 510S each include a fifth lane, 530W, 530N, 530S, respectively, for left turns only (a left turning lane). In this example, the user may input information identifying these features as well as other features such as crosswalks 540-544.

Figure 6:
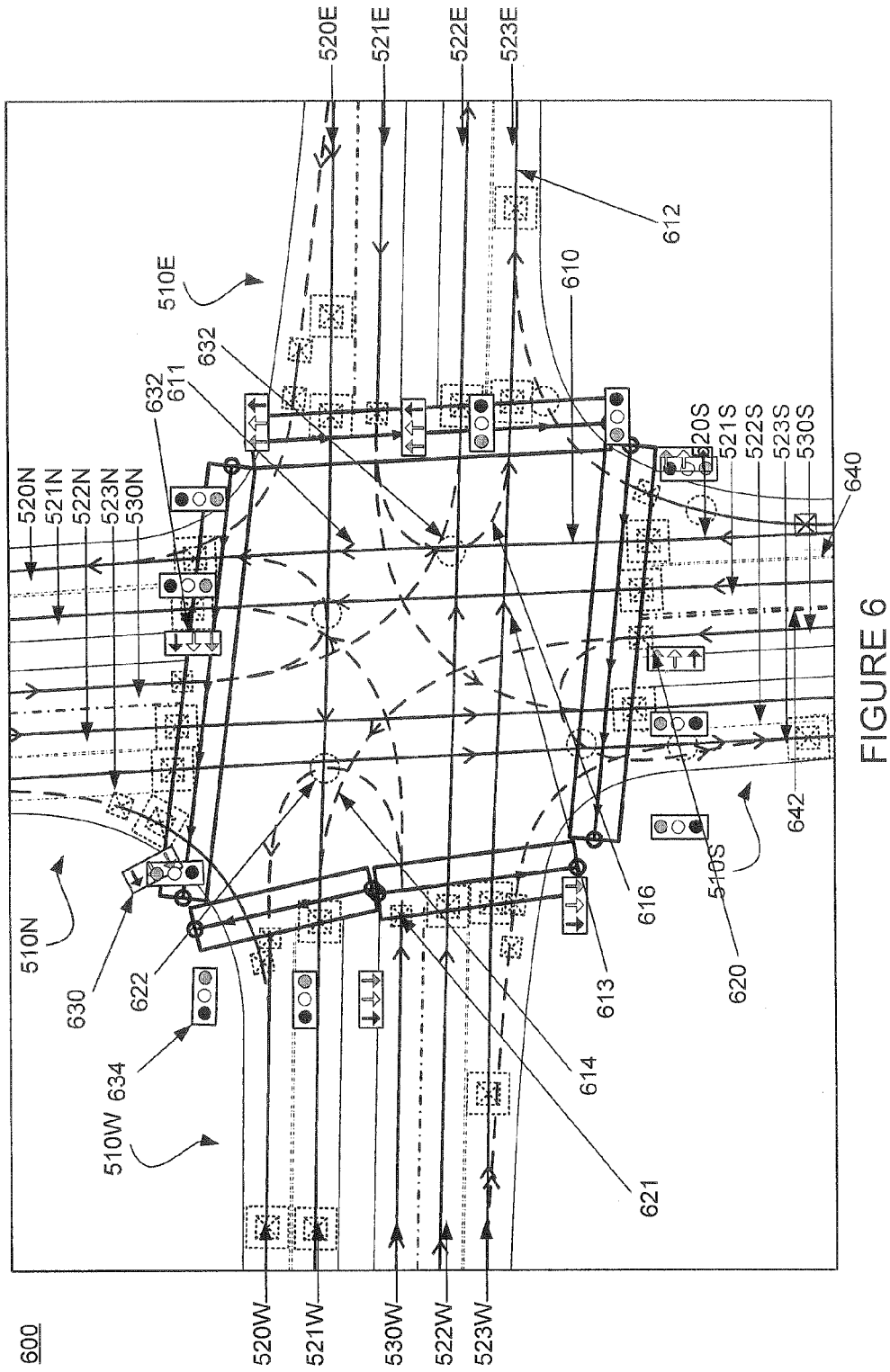
FIG. 6 is a screen shot in accordance with an exemplary embodiment.

As shown in screen shot 600 of FIG. 6, the user may also input information that defines the paths 610, 612 along which a vehicle may follow along the sections of the roadway and through the intersection. Direction arrows 611, 613 indicate the direction that the vehicle may follow along the paths 610, 612, respectively. Dashed lines 614, 616 represent curved paths which a vehicle may follow in order to turn at the intersection.

The user may also define "observation locations" at which the vehicle may stop or must observe some traffic rule such as yielding to other vehicles or waiting for traffic signals before entering the intersection, completing a turn, etc. In one example, observation location square 620 may represent a location at which a vehicle may be required to observe one or more traffic signals before entering the intersection. For example, squares 620, 621 may represent the endpoints of individual lane segments. Circles 622, 623 may represent interior points of the lane segments. In some examples, a square, such as square 621 may represent a location where a lane segment branches into two lane segments.

The user may also input information such as the identification of the location of one or more traffic signals 630, 632, 634. The arrows of traffic signals 630, 632 may represent left turn signal arrows in the traffic signal.

All or some of this information may be inputted manually. In some examples, aspects of the roadway may be estimated by the computer and corrected by the user. For example, the computer may scan satellite images and identify lane lines. These lane lines may be displayed to the user who may adjust the placement, orientation, shape, etc., of lane lines such as lane lines 640, 642. In this example, lane line 640 may represent a dashed white line between two lanes of traffic going in the same direction. Lane line 642 may represent a solid white line between turning lane 530S and lane 521S crossing the intersection. As described in more detail below, the squares may be used by the computer as candidate location of an intersection at which to attach a traffic rule.

Similarly, the user may adjust the placement, orientation, and configuration of other features such as traffic signals, crosswalks, etc.

Figure 7:
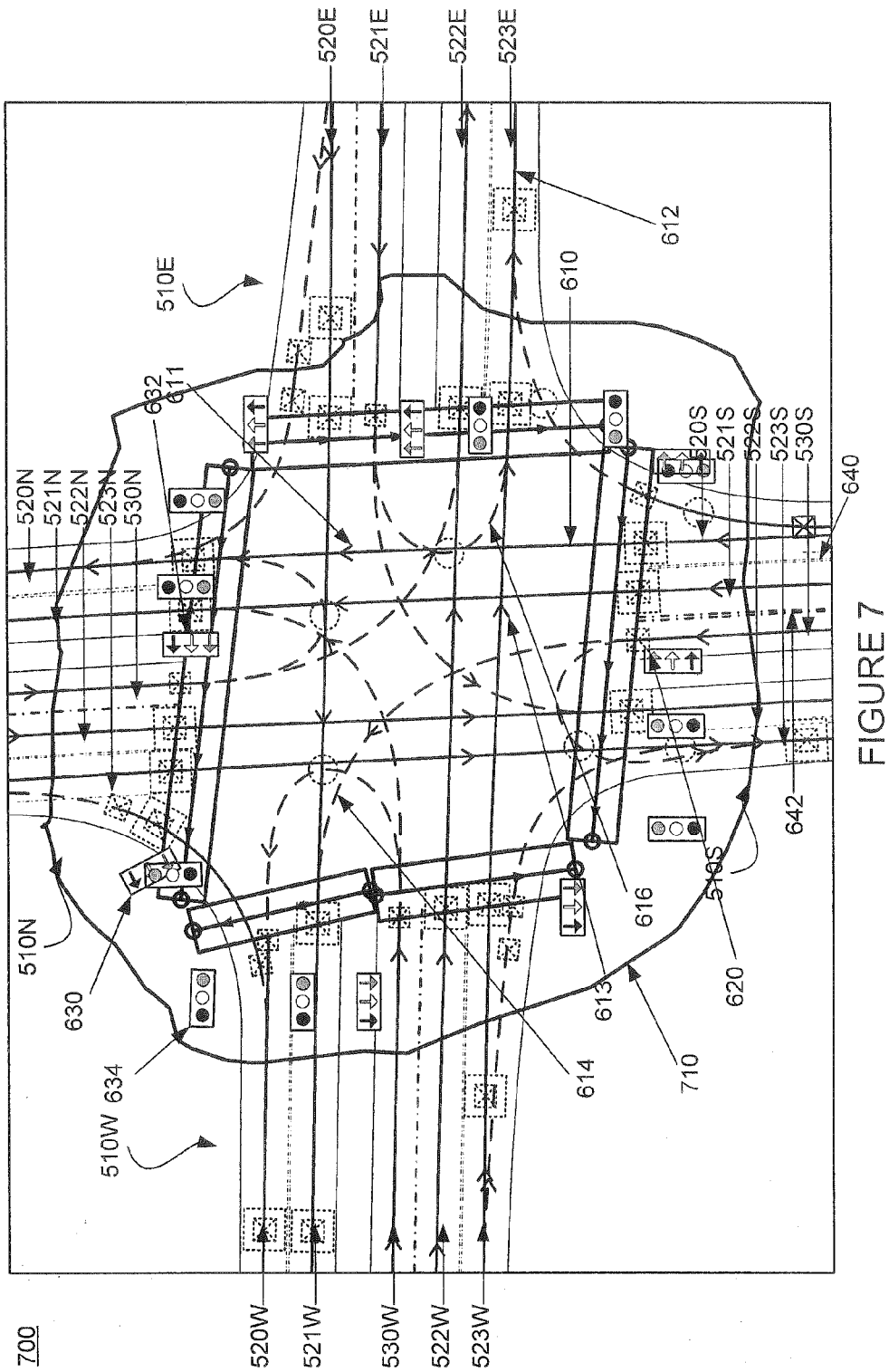
FIG. 7 is a screen shot in accordance with an exemplary embodiment.

Once the paths, traffic signals, and the observation locations have been inputted, aligned, etc., the user may identify the intersection to the computer. For example, as shown in screen shot 700 of FIG. 7, the features of the roadway may be displayed to the user. The user may use an input device, such as a keyboard, mouse, touch screen, etc., to draw a partial or complete perimeter such as loop 710 around the intersection. The perimeter may include the major features of the intersection, for example, traffic signals, observation locations, and at least some portions of the paths which pass through the intersection.

In an alternative, the computer may use various algorithms to identify the intersection as an intersection. For example, the computer may use the geometry of the features of the roadgraph to identify the intersection. In one example, if multiple, non-parallel lanes branch into and out of one another, an intersection may be identified as the smallest area which encloses all of the branch points. Similarly, the computer may observe the paths of other vehicles to identify branching paths and identify an intersection as described above. In other examples, broadcasting units may be attached to traffic lights which broadcast their own notion of the intersection using standard vehicle to infrastructure ("V2I") protocols. This information may then be used to assist the computer in identifying an intersection.

The computer may respond by calculating the actual boundaries of the intersection. The boundaries may include the sides of lanes, which may be a yellow stripe, a dashed white line, a road edge or curb, etc. Before the computer calculates the boundaries, these features may be in arbitrary positions. For example, before calculating a boundary, a particular intersection may have a road going through an intersection. In other words, the yellow or white lane lines or road edges may continue across the intersection from one side to the other. By calculating the boundary, the computer may determine that there should be no yellow or white lane lines or road edges within the intersection. This allows the computer to recognize that additional processing of the intersection is required to identify traffic rules and traffic patterns through the intersection.

Figure 8:
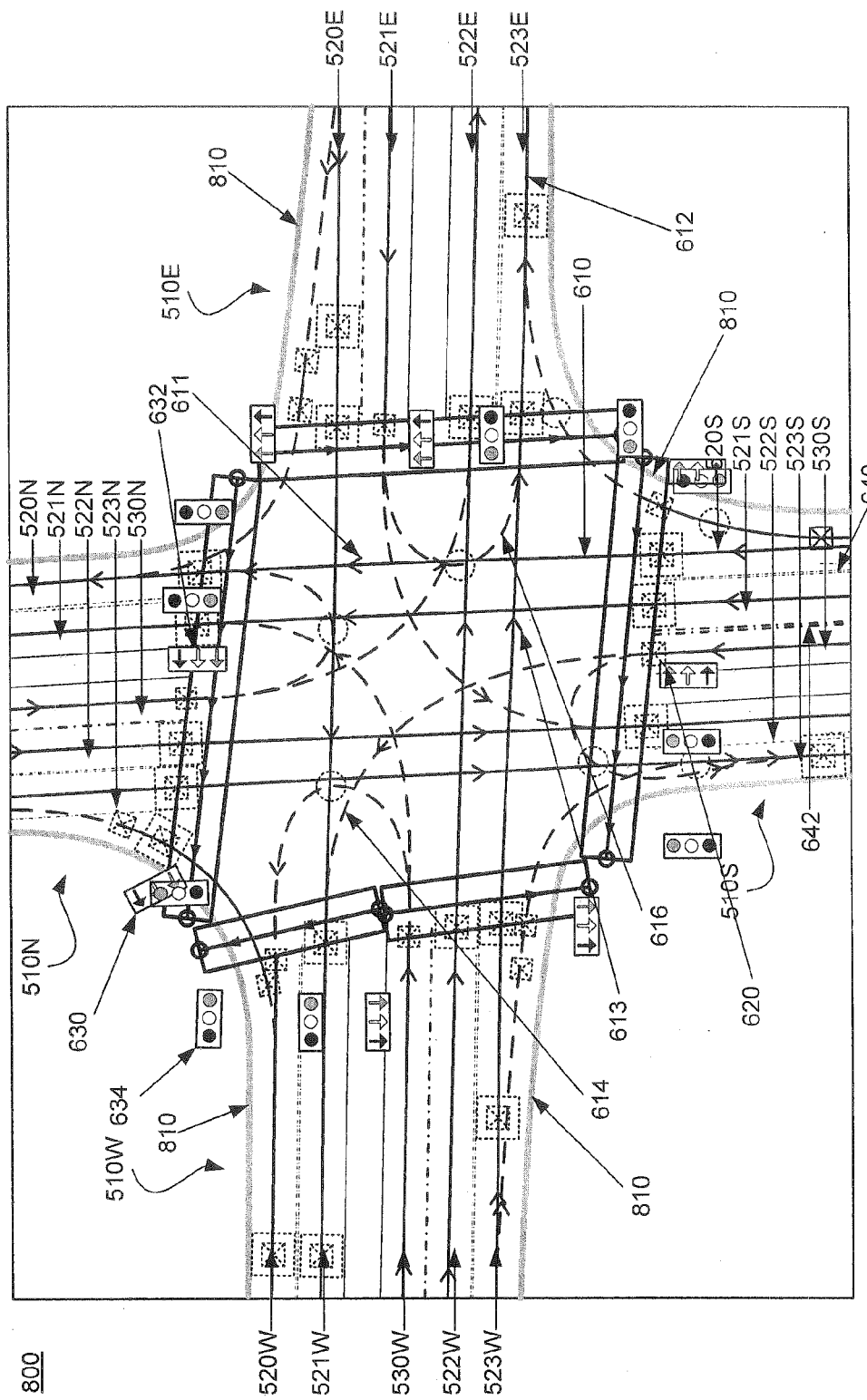
FIG. 8 is a screen shot in accordance with an exemplary embodiment.

This calculation may be based upon, for example, the direction and location of paths, lane lines, and other features. As shown in screen shot 800 FIG. 8, curves 810 may define the boundary of the intersection. In some examples, the boundaries may also be drawn proximate to outside right turning lanes in right-hand drive areas (such as the United States) or proximate to outside left hand turning lanes in left-hand drive areas (such as the United Kingdom).

Figure 9:
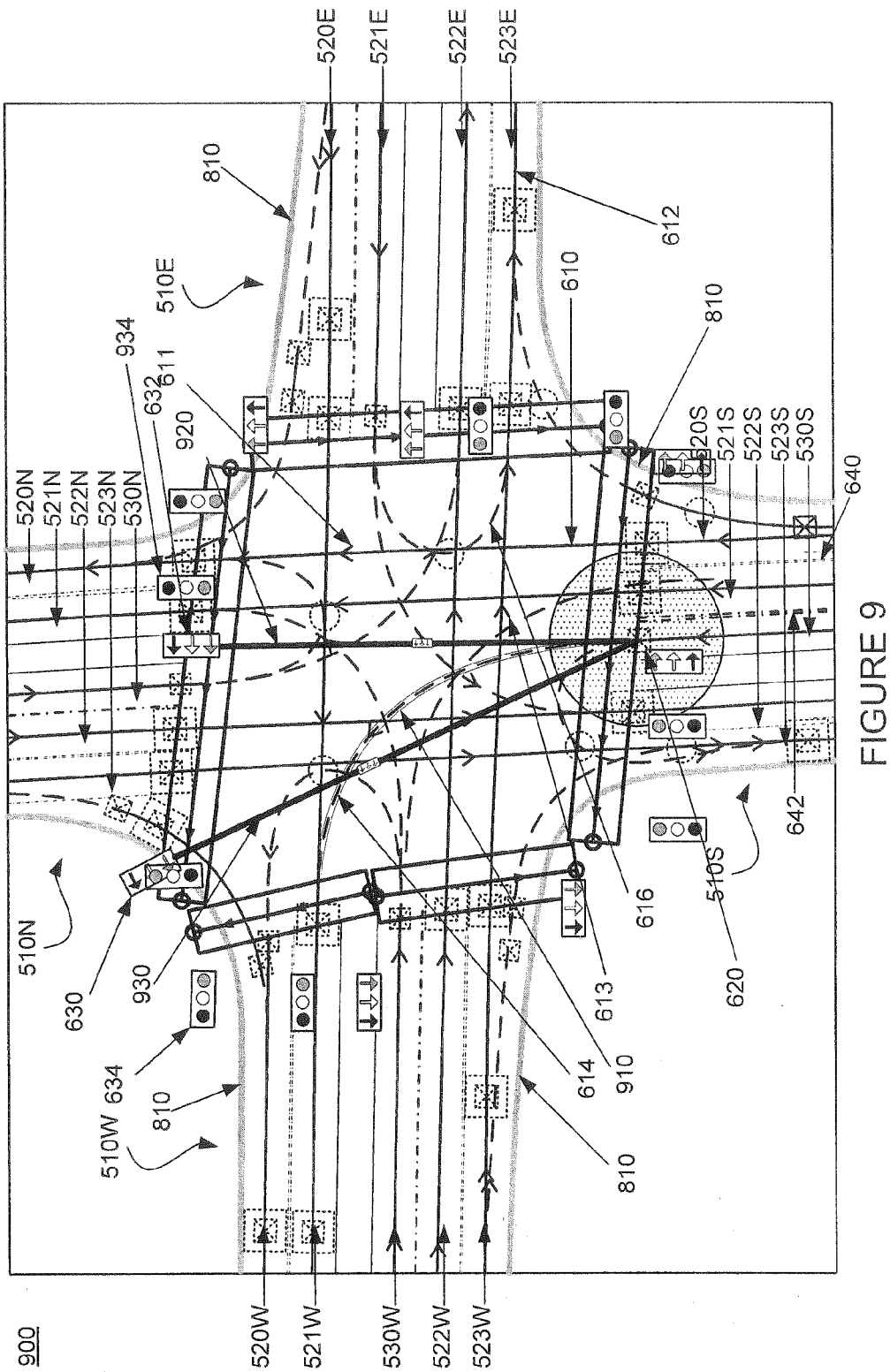
FIG. 9 is a screen shot in accordance with an exemplary embodiment.

Once the boundary has been calculated, the computer may calculate which traffic rules must be observed at each observation location associated with the intersection (as identified by the user's perimeter) before the vehicle enters the intersection, makes a turn, etc. For example, as shown in screen shot 900 of FIG. 9, a vehicle at observation location 620 may make a left turn from turning lane 530S of segment 502S following route 910 towards lane 523S of segment 520W. The computer may then examine the direction of the vehicle at observation location 620, the geometry (or shape) of the route (e.g., the vehicle is making a left turn as opposed to a right turn or going straight through the intersection), the boundary of the intersection, lane lines, and the traffic signals.

The traffic signals may be filtered to identify a set of traffic signals which states (red, green, yellow, etc.) must indicate the vehicle has the right of way through the intersection before the vehicle can move past the particular observation location into the intersection. For example, traffic signal 530 may be relevant to a left turn from segment 520S which signal 634 may not be relevant because it is associated with traffic moving from segment 520E towards 520W. For example, a vehicle approaching observation location 620 may ignore the state of traffic signal 934. Even though this signal is facing the approaching vehicle, the state of traffic signal 934 may be ignored because there is a relevant arrow signal 630 facing the vehicle. Thus, in this example, the arrow signal 630 would trump traffic signal 934. A similar process may be conducted for traffic intersections of different geometries. For example, in a 5-pack traffic signal, or a traffic signal with 5 signal lights as opposed to 3 lights, certain elements of the signal may be ignored while going straight and other elements when making a turning.

Accordingly, at observation location square 620 the computer may determine that a vehicle must observe at least the set of traffic signals including traffic signals 630 and 632 (and their respective states) before moving into the intersection. In this example, the relationship between observation location square 620 and traffic signals 630, 632 may be displayed by relationship lines 920, 930.

Figure 10:
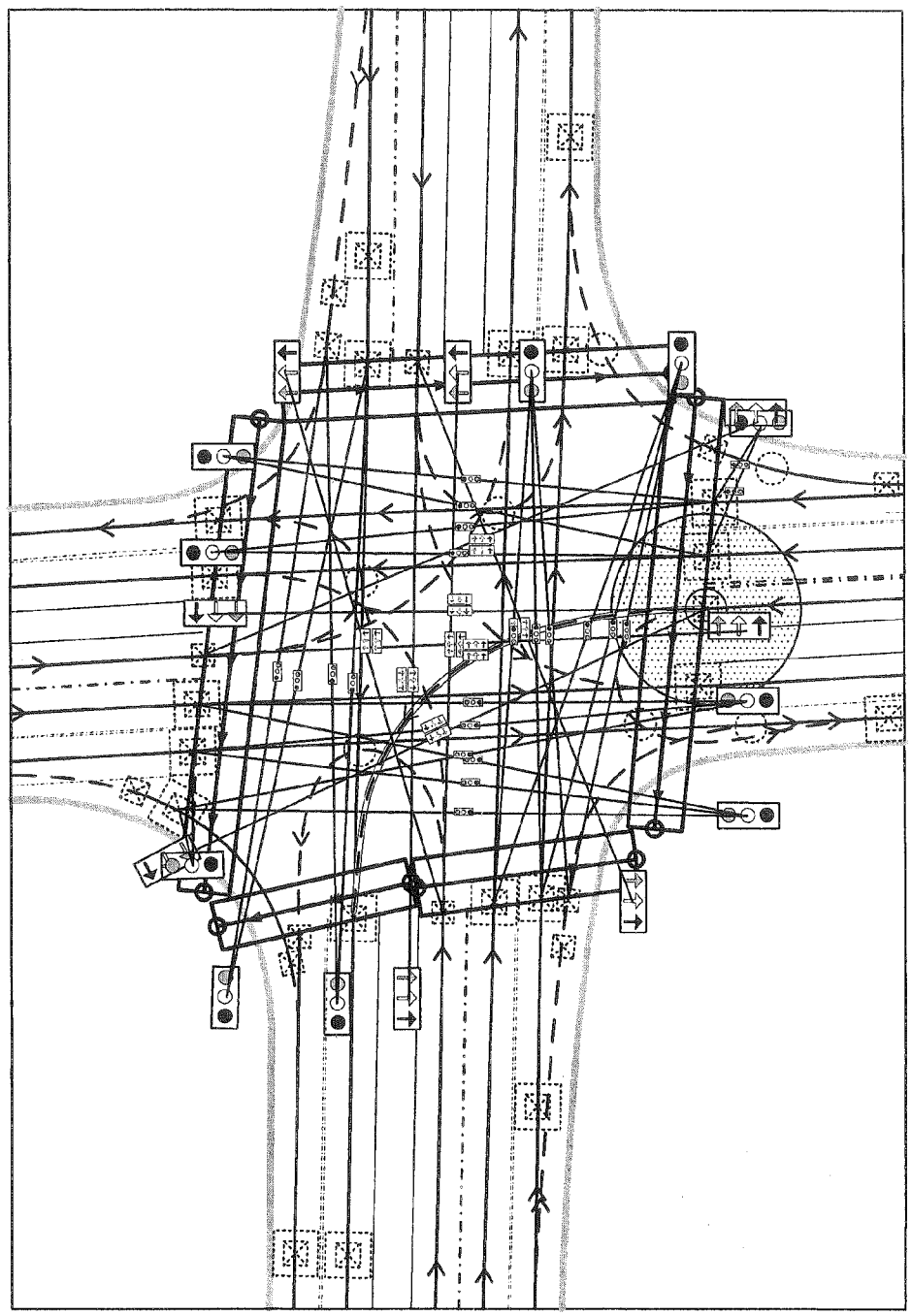
FIG. 10 is a screen shot in accordance with an exemplary embodiment.

This process may be repeated for each observation location. Screen shot 1000 of FIG. 10 depicts the relationship lines for all of the observation location squares which a vehicle would pass through immediately before entering the intersection. As can be seen, the number of relationship lines required for each intersection may be substantial and may increase as the number of lanes and traffic signals at the intersection increase.

As noted above, it may take a human operator a half hour or more to identify all of the relationship lines in order to complete a particular intersection. By automating this process, the resources, for example the number of man hours, required to generate the roadgraph may be dramatically reduced. In addition, it may reduce the number of relationship lines which are misidentified or omitted in the roadgraph.

In some examples, after the computer has identified the relationship lines for a particular intersection, these lines may be displayed to the user, for example, as shown in FIG. 10. The user may then conduct a manual review of the accuracy of the relationship lines and even further increase the accuracy of the roadgraph.

Figure 11:
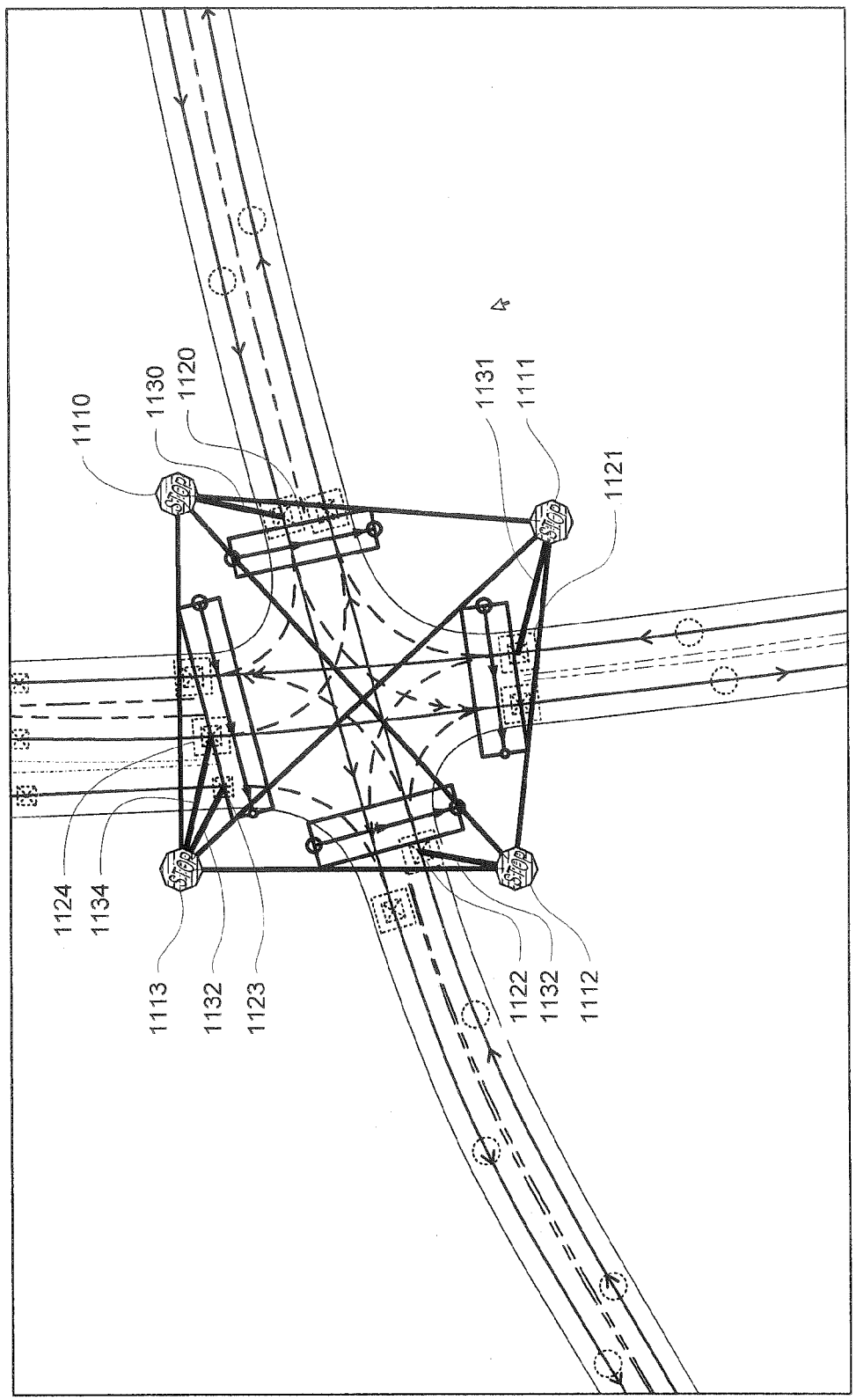
FIG. 11 is a screen shot in accordance with an exemplary embodiment.

In another example, an intersection may include one or more stop signs, as opposed to traffic signals. As shown in FIG. 11, screen shot 1100 includes two roadways intersecting at an intersection. In this example, the users may input the stop signs 1110-1113 and their locations into the computer as well as the observation locations 1120-1124. Unlike the location of lane lines or traffic signals, the placement of the stop signs by the user need not be exactly the location in the real world, but may simply be proximate to the observation locations where the vehicle should stop at the intersection. This is because the vehicle need not observe the stop sign's location to identify the state of the stop sign (as with the traffic signals), but rather the rule of the stop sign, stopping at the intersection.

As in the example above, the computer may display the intersection and the user may trace a perimeter around the intersection. In response, the computer may identify the observation locations and the stop signs and identify the relationships between them (relationship lines 1130-1134) as shown in FIG. 11. The lines between the stop signs may indicate that these stop signs are related in an intersection, and a vehicle must look at other positions when taking its turn at the intersection. In another example, in 4-way intersection with only 2 stop signs, the computer may only attach stop signs to the appropriate lanes (and not all four lanes approaching the intersection) based on the geometry of the intersection and the user's placement of the stop signs.

Once identified, each relationship between the traffic signals or stop signs and the observation locations may be stored graphically. The relationships may be used in conjunction with the boundary of the intersection, and the other identified features to generate a roadgraph. The roadgraph may be transmitted or transferred to a vehicle's computer and used as a tool to maneuver the vehicle as described above.

Figure 12:
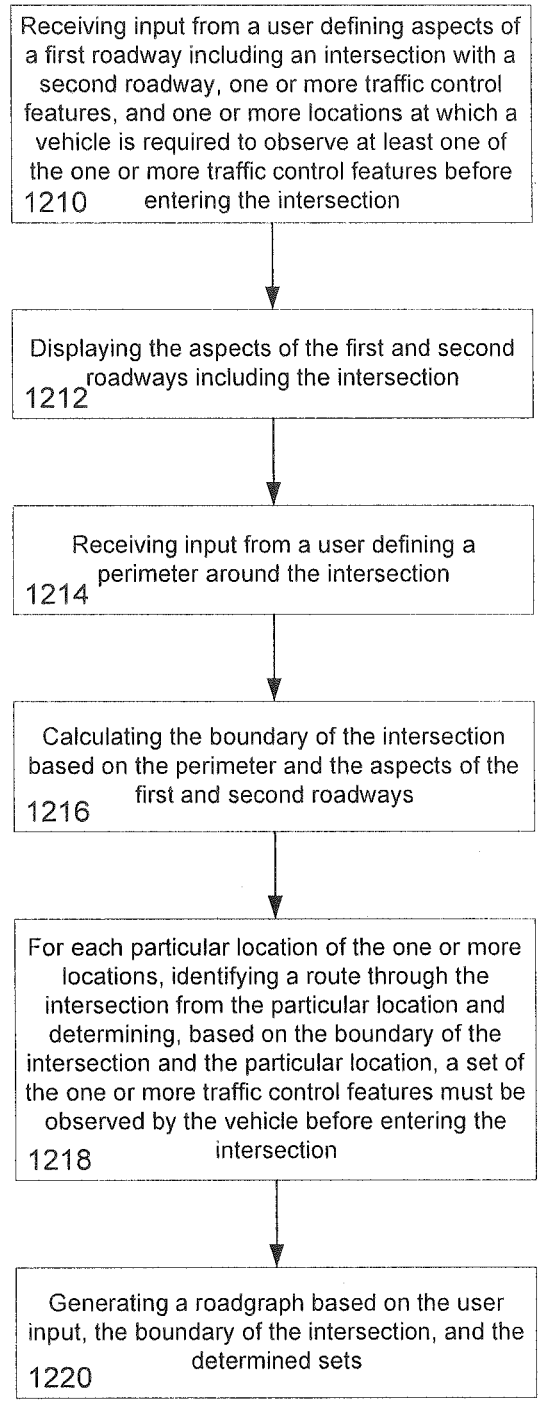
FIG. 12 is a flow diagram in accordance with an exemplary embodiment.

Flow diagram 1200 of FIG. 12 is an exemplary diagram of the aspects described above. The computer receives input from a user defining aspects of a first roadway including an intersection with a second roadway, one or more traffic control features, and one or more locations at which a vehicle is required to observe at least one of the one or more traffic control features before entering the intersection at block 1210. For example, the one or more traffic control features may include a traffic signal (traffic light) or a stop sign. The aspects of the first and second roadways including the intersection may then be displayed, for example, on a display of the computer at block 1212. The computer receives input from a user defining a perimeter around the intersection at block 1214.

The computer calculates the boundary of the intersection based on the perimeter and the aspects of the first and second roadways at block 1216. Next, for each particular location of the one or more locations, the computer identifies a route through the intersection from the particular location and determines, based on the boundary of the intersection and the particular location, a set of the one or more traffic control features must be observed by the vehicle before entering the intersection at block 1218. For example, the identified route may include making a turn from the first roadway to the second roadway or in another example, crossing through the intersection from one section of the first roadway to another section of the first roadway. The computer then generates a roadgraph based on the user input, the boundary of the intersection, and the determined sets at block 1220. This roadgraph may also be transferred to an autonomous vehicle in order to navigate the vehicle along the roadway. In another example, the roadgraph may be displayed to the user so that the user may adjust the determined sets, for example, by moving, adding, or deleting relationship lines. The adjusted data may then be incorporated into the roadgraph.

As these and other variations and combinations of the features discussed above can be utilized without departing from the subject matter as defined by the claims, the foregoing description of exemplary embodiments should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method of generating a roadgraph graphically representing aspects of an intersection, the method comprising:
   accessing information of a first roadway, the information including an intersection with a second roadway, one or more traffic control features, and one or more locations at which a vehicle is required to observe at least one of the one or more traffic control features before entering the intersection;
   calculating a boundary of the intersection based at least on the information of the first roadway;
   for each particular location of the one or more locations:
      identifying a route through the intersection from the particular location; and
      determining, based on the boundary of the intersection and the particular location, a set of the one or more traffic control features to be observed by the vehicle before entering the intersection; and
   generating a roadgraph based on the user input, the boundary of the intersection, and the determined set.

2. The method of claim 1, further comprising transferring the roadgraph to a vehicle in order to navigate the vehicle along the roadway.

3. The method of claim 1, wherein the identified route includes making a turn from the first roadway to the second roadway.

4. The method of claim 1, wherein the identified route includes crossing through the intersection from one section of the first roadway to another section of the first roadway.

5. The method of claim 1, wherein the one or more traffic control features includes a traffic signal light.

6. The method of claim 1, wherein the one or more traffic control features includes a stop sign.

7. The method of claim 1, further comprising:
   adjusting at least one set of the determined sets based on received input;
   wherein generating the roadgraph is further based on the adjusted at least one set.

8. A device for generating a roadgraph graphically representing aspects of an intersection, the device comprising:
   a memory storing information of a first roadway, the information including an intersection with a second roadway, one or more traffic control features, and one or more locations at which a vehicle is required to observe at least one of the one or more traffic control features before entering the intersection;
   a processor coupled to the memory, the processor being operable to:
   calculate a boundary of the intersection based at least on the information of the first roadway;
   for each particular location of the one or more locations:
      identify a route through the intersection from the particular location; and
      determine, based on the boundary of the intersection and the particular location, a set of the one or more traffic control features to be observed by the vehicle before entering the intersection; and
   generate a roadgraph based on the user input, the boundary of the intersection, and the determined set.

9. The device of claim 8, wherein the processor is further operable to transfer the roadgraph to a vehicle in order to navigate the vehicle along the roadway.

10. The device of claim 8, wherein the identified route includes making a turn from the first roadway to the second roadway.

11. The device of claim 8, wherein the identified route includes crossing through the intersection from one section of the first roadway to another section of the first roadway.

12. The device of claim 8, wherein the one or more traffic control features includes a traffic signal light.

13. The device of claim 8, wherein the one or more traffic control features includes a stop sign.

14. The device of claim 8, wherein the processor is further operable to:
   adjust at least one set of the determined sets based on received input;
   wherein the processor generates the roadgraph based on the adjusted at least one set.

15. A tangible, non-transitory, computer-readable storage medium on which computer readable instructions of a program are stored, the instructions, when executed by a processor, cause the processor to perform a method of generating a roadgraph graphically representing aspects of an intersection, the method comprising:
   accessing, by a processor, information of a first roadway, the information including an intersection with a second roadway, one or more traffic control features, and one or more locations at which a vehicle is required to observe at least one of the one or more traffic control features before entering the intersection;
   calculating a boundary of the intersection based at least on the information of the first roadway;
   for each particular location of the one or more locations:
      identifying a route through the intersection from the particular location; and
      determining, based on the boundary of the intersection and the particular location, a set of the one or more traffic control features to be observed by the vehicle before entering the intersection; and
   generating a roadgraph based on the user input, the boundary of the intersection, and the determined set.

16. The computer-readable storage medium of claim 15, further comprising transferring the roadgraph to a vehicle in order to navigate the vehicle along the roadway.

17. The computer-readable storage medium of claim 15, wherein the identified route includes making a turn from the first roadway to the second roadway.

18. The computer-readable storage medium of claim 15, wherein the identified route includes crossing through the intersection from one section of the first roadway to another section of the first roadway.

19. The computer-readable storage medium of claim 15, wherein the one or more traffic control features includes at least one of a traffic signal light and a stop sign.

20. The computer-readable storage medium of claim 15, wherein the method further comprises:
   adjusting at least one set of the determined sets based on received input;
   wherein generating the roadgraph is further based on the adjusted at least one set.

\* \* \* \* \*